Figure 1:
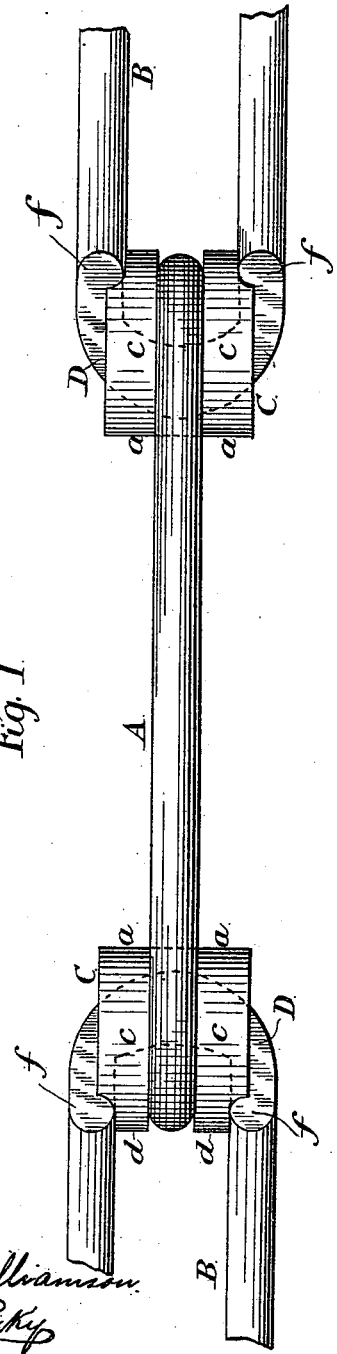

(Model.)

W. D. EWART.
DRIVE CHAIN.

No. 377,552.  Patented Feb. 7, 1888.

ATTEST.

INVENTOR.
W. D. Ewart,
Per _____
Attorney (Model.) 3 Sheets—Sheet 2.

W. D. EWART.
DRIVE CHAIN.

No. 377,552. Patented Feb. 7, 1888.

ATTEST.
A. M. Williamson
M. J. Jaretzky

INVENTOR.
W. D. Ewart
Per J. N. McIntire
Attorney (Model.) 3 Sheets—Sheet 3.

W. D. EWART.
DRIVE CHAIN.

No. 377,552. Patented Feb. 7, 1888.

ATTEST.
J. Henry Kaiser.
James S. Smith.

INVENTOR.
William D. Ewart,
By J. N. McIntire
Atty.

UNITED STATES PATENT OFFICE.

WILLIAM D. EWART, OF CHICAGO, ILLINOIS, ASSIGNOR TO THE EWART MANUFACTURING COMPANY, OF SAME PLACE.

DRIVE-CHAIN.

SPECIFICATION forming part of Letters Patent No. 377,552, dated February 7, 1888.

Application filed November 18, 1887. Serial No. 255,486. (Model.)

*To all whom it may concern:*

Be it known that I, WILLIAM D. EWART, of Chicago, in the county of Cook and State of Illinois, have invented a new and useful Improvement in Conveyer and Drive Chains; and I do hereby declare that the following is a full, clear, and exact description thereof, reference being had to the accompanying drawings, making part of this application.

My invention relates to that species of cable chain in which bearer-blocks are combined with the usual centrally-open links in such manner as to relieve the links themselves, more or less, of frictional wear at the localities of the joints of the chain, and to provide more extensive, and hence more durable, wearing-surface than possible in that form of cable chain in which the links are directly articulated or enchained.

In the species of chain to which my invention or improvement relates it has been common in some cases to make the interposed bearer-blocks duplicates, and to have each articulation of the chain composed of two blocks, the ends of the links engaged therewith being arranged to work or turn in saddle-like grooves formed in said blocks. In other cases the blocks have been arranged to turn on or work against each other, the links and blocks having no relative motion, while in other cases still the structure of the blocks and the arrangement of them with the links has been such that one of the links engaged with a set of bearer-blocks has been capable of motion relatively to the block engaged with it, while the other one has been arranged with its block so that it could move only with said block; but in all the forms heretofore made of the species of chain to which my improvement relates the principle of construction and mode of operation have been such that it has been rather necessary, if not indispensable, that the chain-wheels over which these chains are run should have their peripheries grooved to properly seat those portions of the bearer-blocks designed to bear on the wheels' peripheries, and such that for some purposes, and especially when used in connection with that kind of chain-wheel having alternately-arranged single and double sprockets or teeth, there has been an insufficiency of bearing-surfaces on the bearer-blocks for the most desirable action on the chain of the teeth or sprockets of the chain-wheels.

I propose to provide for use a chain of the species alluded to which shall possess the capacity to work perfectly in conjunction with chain-wheels or sprocket-wheels having plain or flat peripheral bearing-surfaces for the chain, (and that are therefore cheaper than those having grooved peripheries,) and which shall also afford greater and hence more efficient bearing or working surfaces for coaction with the working-faces of the teeth or sprockets of the chain-wheels over which the chain may be run, especially in cases in which that species of wheels having alternate single and double teeth may be used; and to these main ends and objects my invention may be said to consist, essentially, in a chain of the species alluded to in which those surfaces designed to come into contact with the peripheries of the wheels (intermediately of the teeth of the latter) are adapted to come to perfect bearings on wheels the peripheries of which (intermediately of the teeth) are plain or flat, and in which, also, a greater area of and more efficient bearing-surfaces for conjoint action with the working-faces of the wheels' teeth are provided, all as will be hereinafter more fully explained, and as will be particularly pointed out in the claims of this specification.

To enable those skilled in the art to which my invention relates to make and use chains embracing my improvement, I will now proceed to more fully describe the latter, referring by letters to the accompanying drawings, which form part of this specification, and in which I have shown my invention carried into effect in that form in which I have so far successfully practiced it, though other forms may be adopted and devised which may serve equally well with that shown the purposes of my improved construction.

Figure 2:
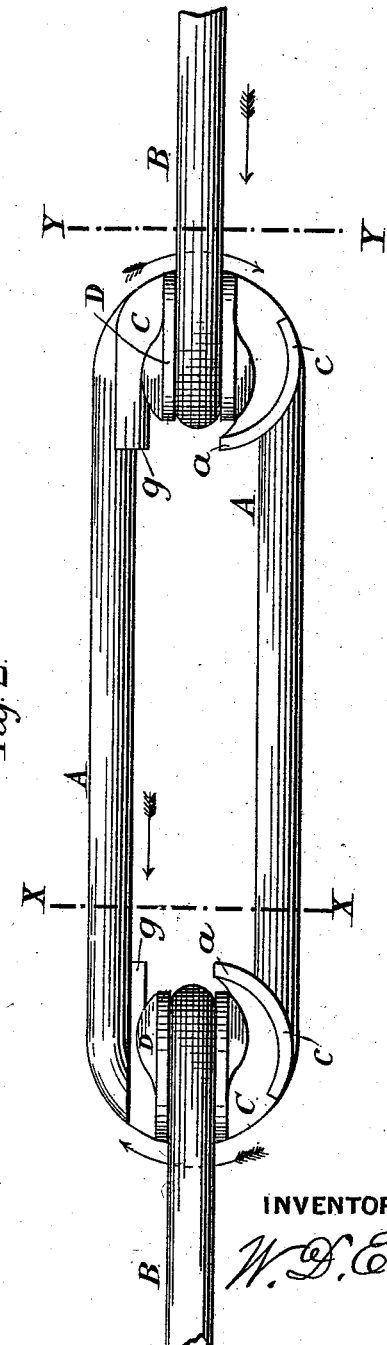
Figure 5:
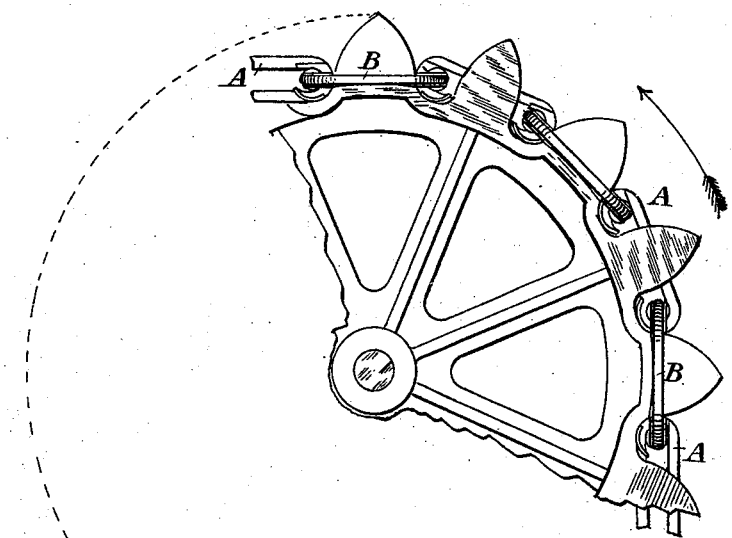
Figure 3:
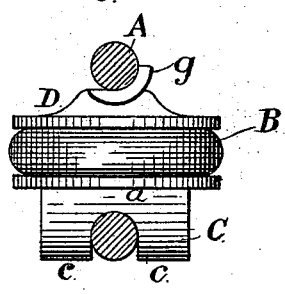
Figure 4:
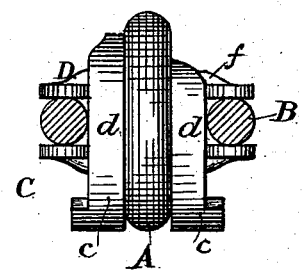
Figure 6:
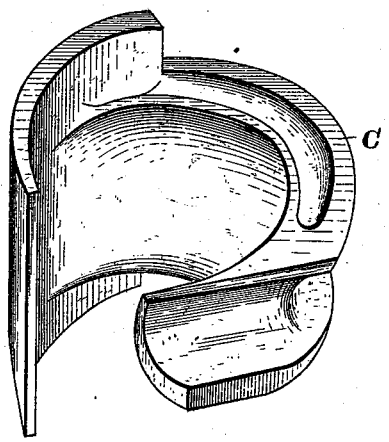
Figure 7:
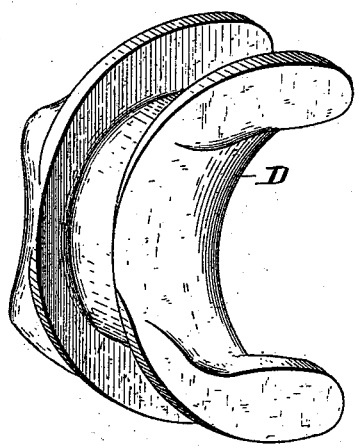

In the drawings, Figure 1 is an elevation looking directly at that side or surface of the chain that is designed to run adjacent to the peripheries of the wheels over which the chain may be worked. Fig. 2 is an elevation of the chain viewed in a direction transverse to that in which the chain is seen at Fig. 1. Fig. 3 is a vertical section at the line $x$ $x$ of Fig. 2, looking in the direction indicated by the arrow at said figure. Fig. 4 is a vertical section at $y$ $y$, Fig. 2, looking in the direction indicated by the arrow in that figure. Fig. 5 is an elevation giving the same view of the chain as that seen at Fig. 2, but showing the chain on a reduced scale and in connection with a sprocket-wheel having alternate single and double teeth. Figs. 6 and 7 are respectively perspective views of the two bearer-blocks detached and drawn on a somewhat enlarged scale.

In the several figures the same parts will be found designated by the same letters of reference.

A and B represent, respectively, the duplicate links, which are arranged alternately in transverse planes in the usual manner, while C and D represent, respectively, the two cast-metal bearer-blocks, which constitute each set of blocks forming each one of the joints or articulation of the chain. One of these blocks, C, is formed, as shown, with the usual saddle-like recess or curved seat for the accommodation of the semicircular end of one of the links A, and also has that portion which is designed to come in contact with the periphery of the chain-wheel formed with extensive bearing-surfaces, as seen at $c$ $c$, that are curved in the direction of the length of the chain, but flat in the transverse direction, and which unite in a continuous flat surface (widthwise of the chain) at the vicinity of the upper edge, $a$, of this part of the bearer-block. Said casting or bearer-block is also formed, as clearly shown, with extensive bearing-surfaces at $d$ $d$, which, like the surfaces $c$ $c$, are curved in the direction of the length of the chain, but are plane or flat in the transverse direction, for a purpose to be presently explained.

The bearer-block or casting D is shaped differently from the other block, although it also has a saddle-like seat or bearing for the semicircular end of one of the links, B, as plainly shown. Said block D has curved ear-like extensions $f$, which embrace the body portion of the block C in such manner, as plainly shown, that the two blocks are capable only of articulate movement, or of turning relatively in one direction only; but the shape of the block D and the arrangement therewith of the semicircular end of the link B are such, as will be plainly seen by reference to the drawings, that the link B is free to turn or articulate about the block D as a bearing-surface or axis of motion in the manner or in the direction indicated by arrows at Fig. 2.

The block C, it will be observed, is made, as usual with many other bearer-blocks, with leg-like extension at $g$, which prevents any relative movement of the said block and the link A, with which it is combined.

From the foregoing explanation as to the structure of the blocks and their arrangement with each other and with the links, in connection with what is shown in the drawings, it will be readily understood that in the working or operation of my improved chain the latter in passing over or partially around a wheel, as shown, for instance, at Fig. 5, will have the necessary flexibility in the proper direction by reason of the capacity of relative motion of the two bearer-blocks C and D, each of the said bearer-blocks maintaining an unchanged relative position to the link with which it is directly connected during the bending or articulation of the chain in the direction indicated at Fig. 5. In case of necessity, however, for a bending or articulation of the chain-links in the direction transverse to that necessary for passing over wheels, as indicated at Fig. 5, the bending of the chain in a transverse direction is made possible by the capability of the links B to turn or oscillate at their curved ends round about the saddle-like recesses and bearing-surfaces of the blocks D.

My improved chain is designed especially and mostly for use in the manner illustrated at Fig. 4, under which conditions there is no necessity for any substantial relative movement of the links B and blocks D; but, as just above explained, in case of the necessity, under certain circumstances, to have the same chain capable of passing around or working in connection with wheels located in transverse planes, the chain can be bent in both directions, as already explained.

By having the blocks C formed, as shown, with the extensive and flat or plane bearing-surfaces at $c$ $c$, I am enabled to run the chain, as shown, in contact with chain-wheels or sprocket-wheels having simple flat or plane peripheral surfaces between the teeth or sprockets, thus not only avoiding the expense of making and using wheels with grooved peripheries and adapting the chain to be run on ordinary sprocket-wheels made to work with the other species of chain, but also gaining greatly in the superficial extent of wearing-surface between the contacting portions of the bearer-blocks of the chain and the periphery of the wheel.

By extending the flat and broad bearing-surfaces $c$ $c$ upwardly, as shown, (whether they be united near the edge $a$ or not,) bearing-surfaces or working-faces are afforded or provided to co-operate with the working-faces of the duplex or double teeth in that kind of wheel shown at Fig. 5, and this provision of such suitable bearing-surfaces to coact with these double (or link-straddling) teeth of this species of wheel (which is, I believe, wholly original with me in a chain of the species to, which my improvements relate) I consider a very important part of my invention.

By the formation of the large flat bearing-surfaces at $d$, I get a much more efficient and durable wearing-surface for co-operation with the working-faces of the single teeth of the kind of wheel shown in the drawings, and as this form of sprocket-wheel is an exceedingly efficient one for use in connection with all chains of the cable species I accomplish a great desideratum by the better adaptation, as explained, of a cable chain to this species of wheel.

I am not aware of any cable chain of that species which involves the use of cast-metal bearer-blocks at the vicinity of the joints having been heretofore made with suitable and efficient bearing-surfaces (such as hereinbefore described) for the action of both the single and the double teeth of that kind of sprocket-wheel hereinbefore alluded to.

Of course the precise forms and proportions of the parts may be changed more or less, so long as the described novel principle of construction and mode of operation be retained, without departing from the spirit of my invention.

What I claim as new, and desire to secure by Letters Patent, is—

1. A drive-chain composed of alternately transversely-arranged centrally-open links A and B and bearer-blocks C and D, one of which, C, is incapable of any movement relatively to the link with which it is directly assembled, and the other of which, D, is incapable of movement relatively to the link with which it is directly combined when the chain is bent in one direction, as specified, but relatively to which the said link is movable when the chain is bent in the opposite direction, all in the manner and for the purpose hereinbefore set forth.

2. In a cable chain having combined with its centrally-open links interposed bearer-blocks, a bearer-block or casting, C, formed with bearing-surfaces at $c\ c$, which are plane or flat in a direction transverse to the length of the chain, and which are thus adapted to work in contact with a chain-wheel the periphery of which is plane or flat between the teeth or sprockets, substantially as and for the purposes hereinbefore set forth.

3. In a cable chain comprising transversely-arranged centrally-open links and interposed bearer-blocks, as specified, a bearer-block or casting, C, which is formed, as specified, with bearing-surfaces for the working-faces of the single teeth, and also with bearing-surfaces for the working-faces of the double teeth of that well-known species of sprocket-wheel which has alternately-arranged duplex and single teeth, all substantially as hereinbefore set forth.

In witness whereof I have hereunto set my hand this 15th day of November, 1887.

WILLIAM D. EWART.

In presence of—
WM. A. ROWLAND,
R. M. CAMPBELL.